W. J. CLARKE & S. A. STREAM.
GRASS CUTTING ATTACHMENT FOR CARS.
APPLICATION FILED JAN. 25, 1909.
940,514.
Patented Nov. 16, 1909.
4 SHEETS—SHEET 1.
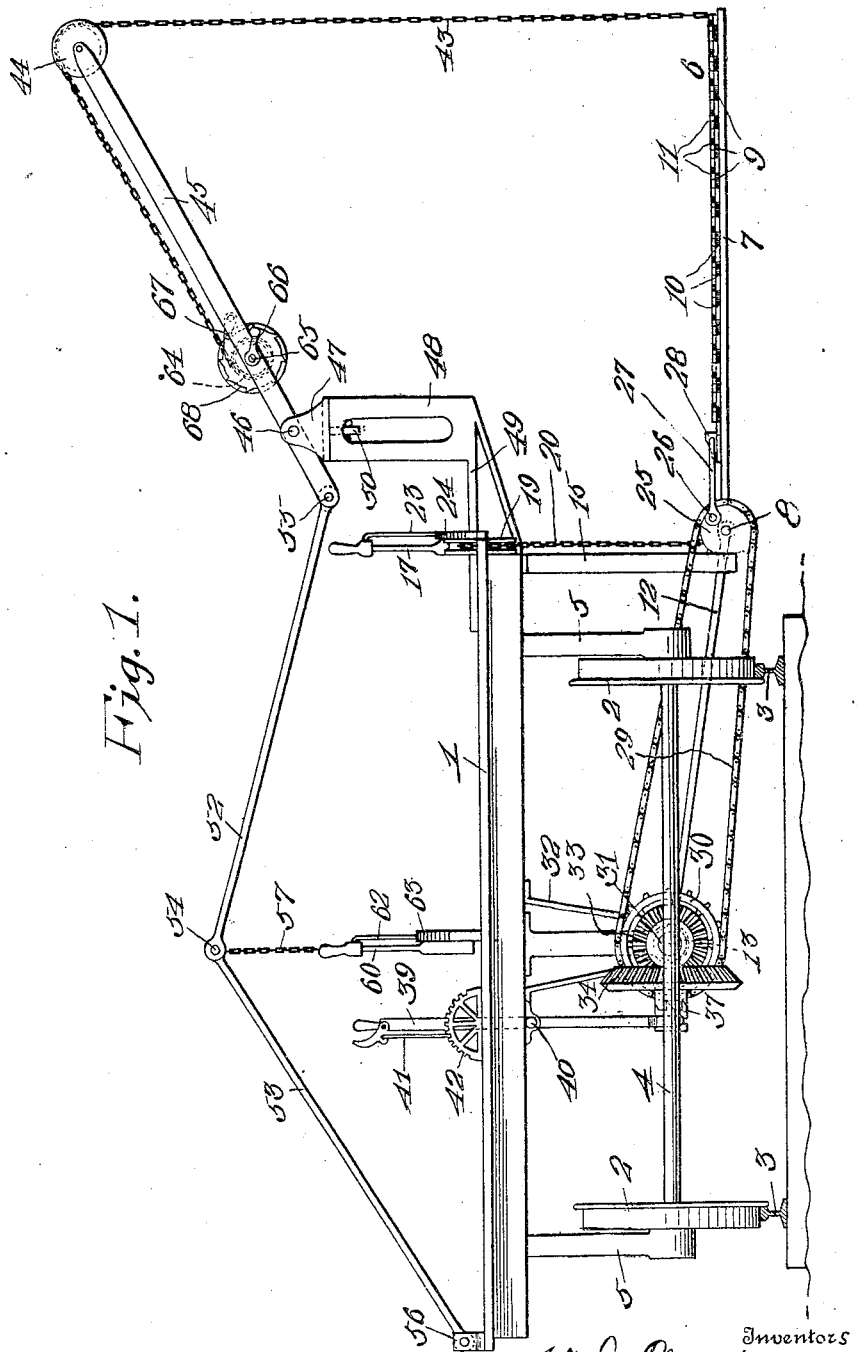

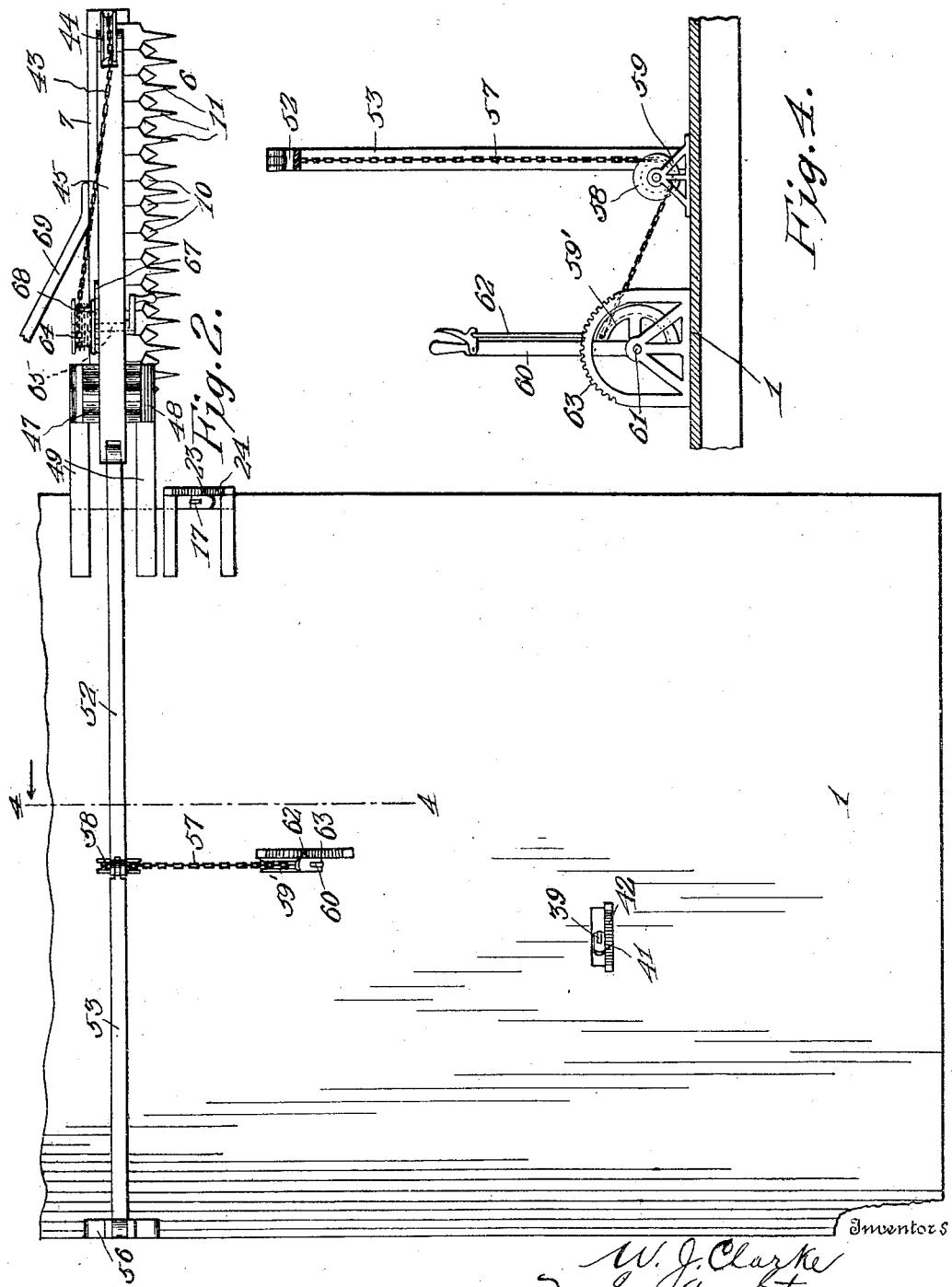

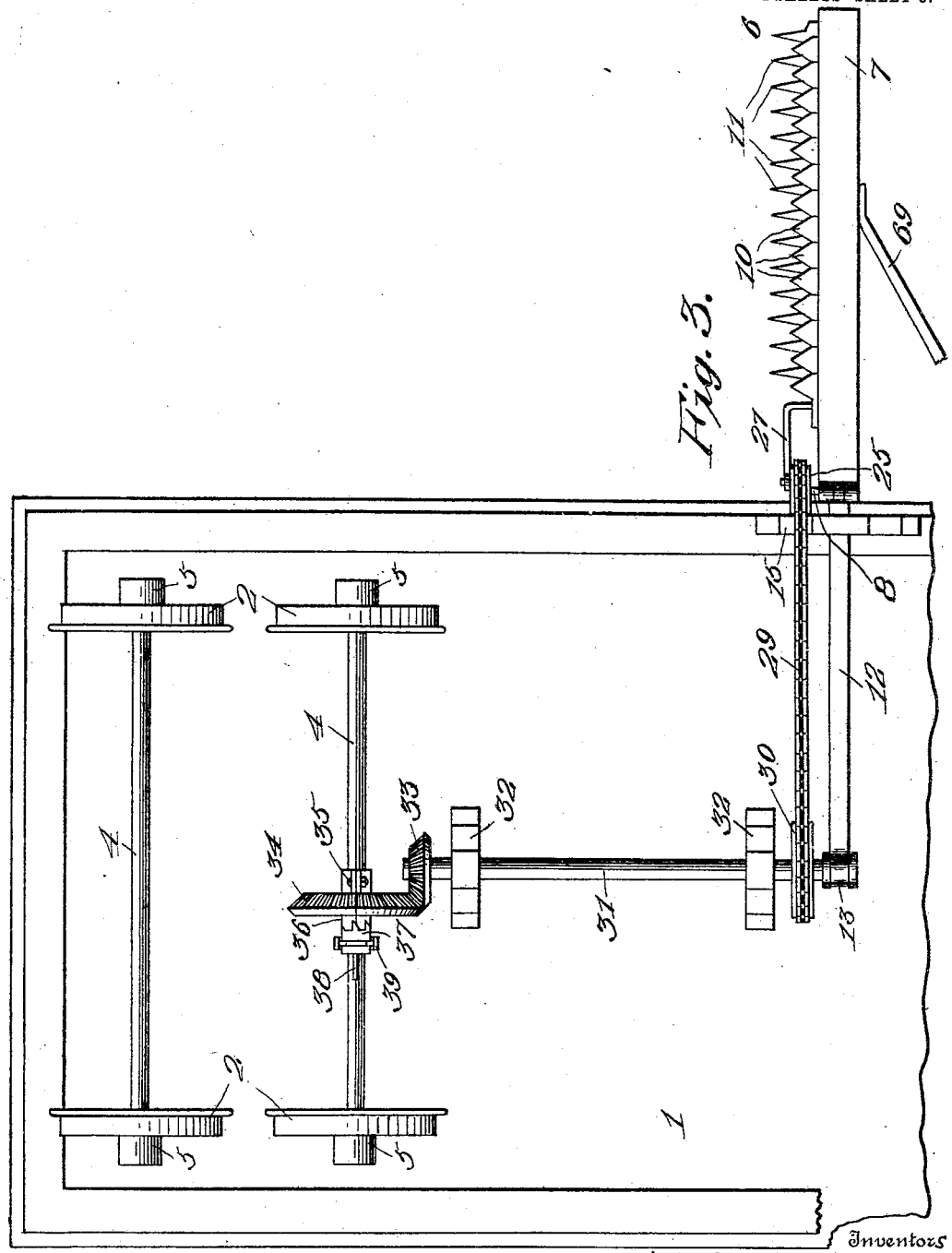

W. J. CLARKE & S. A. STREAM.
GRASS CUTTING ATTACHMENT FOR CARS.
APPLICATION FILED JAN. 25, 1909.
940,514.
Patented Nov. 16, 1909.
4 SHEETS—SHEET 4.
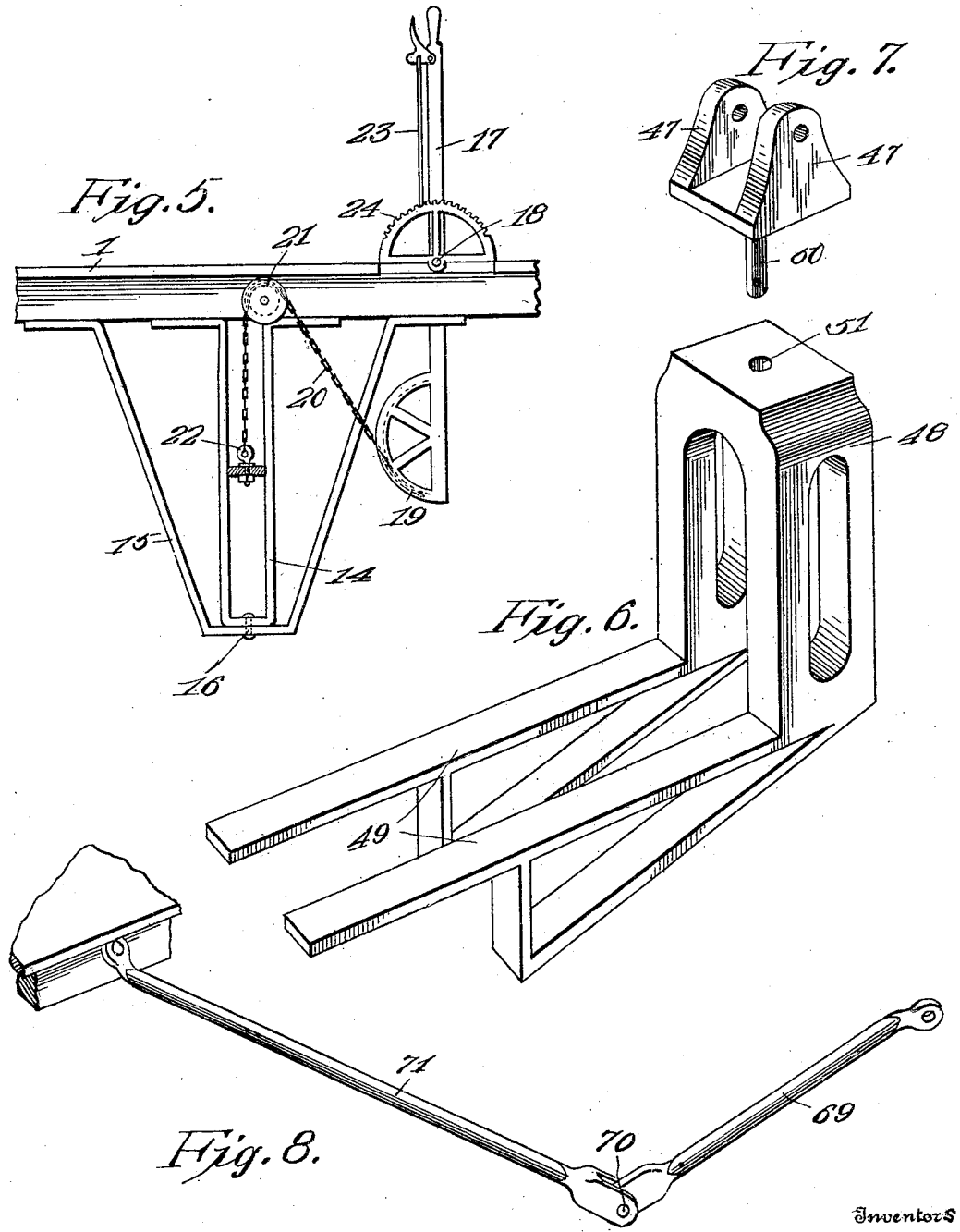

UNITED STATES PATENT OFFICE.

WALTER J. CLARKE AND SAMUEL A. STREAM, OF EL RENO, OKLAHOMA; SAID STREAM ASSIGNOR OF ONE-HALF OF HIS RIGHT TO SAID CLARKE.

GRASS-CUTTING ATTACHMENT FOR CARS.

940,514.      Specification of Letters Patent.     Patented Nov. 16, 1909.

Application filed January 25, 1909. Serial No. 474,132.

*To all whom it may concern:*

Be it known that we, WALTER J. CLARKE and SAMUEL A. STREAM, citizens of the United States, residing at El Reno, in the county of Canadian and State of Oklahoma, have invented certain new and useful Improvements in Grass-Cutting Attachments for Cars, of which the following is a specification, reference being had to the accompanying drawings.

This invention relates to improvements in mowing machines and more particularly to a grass cutting attachment for use on railway cars for trimming the grass along the sides of the track.

The object of the invention is to provide a mechanism or apparatus of this character which will be simple and practical in construction, easy to adjust and control and very effective for the purpose intended.

With the above and other objects in view, the invention consists of the novel features of construction and the combination and arrangement of parts hereinafter fully described and claimed, and illustrated in the accompanying drawings, in which—

Figure 1 is an end elevation of a railway car having the improved mower or grass cutting attachment applied thereto; Fig. 2 is a detail top plan view of the same; Fig. 3 is an inverted plan or bottom view; Fig. 4 is a detail vertical section taken on the plane indicated by the line 4—4 in Fig. 2; Fig. 5 is a detail side elevation showing the device for raising and lowering the inner end of the cutting mechanism; Fig. 6 is a detail perspective of the bracket which carries the beam for supporting the outer end of the cutting mechanism; Fig. 7 is a detail perspective of the cap for said bearing bracket; and Fig. 8 is a detail perspective view of the diagonal brace for the cutting mechanism showing the joint in the same which permits the cutter bar to swing on its pivot.

In the drawings 1 denotes a portion of the body or platform of a railway car or the like provided with supporting wheels 2 to run on track rails 3 and fixed to rotating axles 4 journaled in suitable bearings 5.

6 denotes the improved grass cutting mechanism which is driven from one of the axles. This mechanism is duplicated on opposite sides of the car, the mechanism on one side being driven from one of the axles 4 at one end of the car and the mechanism on the other side of the car being driven from one of the axles at the other end of the car. In the drawings, however, but one of said mechanisms is illustrated and it is arranged adjacent to the center of the car. It comprises a body member or bar 7 adapted to extend outwardly from the side of the car and having its inner end mounted on a pivot 8 and its outer end suitably supported, as presently explained. Said bar 7 has mounted upon it for reciprocation a cutter bar 9, the teeth 10 of which work in guard fingers 11 similar to the usual cutting mechanism of mowing machines.

The pivot 8 is arranged in one end of a swinging hanger bar 12, the other end of which is pivoted on a shaft 31, hereinafter more fully described. The outer portion of said hanger 12 swings in an inverted U-shaped guide 14 which depends from one of the side edges of the platform and which is reinforced by inclined braces 15 formed integral with each other and secured to the bottom of the guide 14, as shown at 16, their diverging upper ends being secured to the bottom of the platform or car body, as shown more clearly in Fig. 5. The lower and outer end of the hanger 12 is adapted to be raised or lowered to properly position the cutting mechanism 6 with respect to the level of the ground, by means of a handle lever 17 pivoted intermediate its ends at 18 upon one side of the car platform and having at its lower end a segmental head 19 to which is attached to one end of a chain 20. Said chain is passed around a guide pulley 21 journaled above the guide 14 and has its other end attached to an eye bolt 22 provided upon the hanger 12. The upper or handle end of the lever 17 carries the usual locking pawl 23 to co-act with a segmental rack 24 and thereby lock the lever, and hence the hanger 12, in any adjusted position.

Loosely mounted upon a projecting end of the pivot 8 is a sprocket wheel 25 upon the front face of which is provided a crank pin 26. A pitman 27 has one of its ends engaged with the crank pin and its other end bent angularly and pivoted at 28 to the inner end of the reciprocatory cutter bar 9 of the cutting mechanism 6. Said sprocket wheel 25 is connected by a loose sprocket chain 29 to a sprocket wheel 30 fixed to one end of a longitudinal shaft 31 journaled in bearings in suitable hangers 32 depending from the car platform. Fixed to the other end of the shaft 31 is a beveled pinion 33 which meshes with a beveled gear 34 upon one of the axles 4. Said gear 34 is preferably made in two sections to receive the axle between them and secured by bolts or other fastenings, as at 35. Upon one side of said gear 34 is formed a clutch member 36 with which co-acts a similar clutch member or sleeve 37 slidably but non-rotatably mounted on the shaft 31 by means of a key 38. The sliding clutch member 37 is actuated by a hand lever 39 to the forked lower end of which it is suitably connected. Said lever 39 is pivoted intermediate its ends at 40 in a bearing beneath the car platform and its upper end which projects through an opening in said platform carries a locking pawl 41 to co-act with a segmental rack 42, as shown in Fig. 1.

For the purpose of raising and lowering the outer end of the cutting mechanism 6 so that it may be held at different angles according to the inclination of the ground over which it operates and so that it may be raised to a substantially vertical position when not in use, the outer end of its body bar 7 is connected to one end of a chain 43 which passes over a guide pulley 44 journaled in the forked outer end of a swinging beam or lever 45. The latter is pivoted intermediate its ends at 46 in a forked cap 47 rotatable upon a standard 48 formed on a bracket 49 projecting from and attached to the side of the car platform. Said cap plate 47 is formed with a depending pivot stud 50 which rotates in a bearing opening 51 formed in the top of the upright 48, as clearly shown in Figs. 1, 6 and 7 of the drawings. The short inner end of the supporting beam or lever 45 is operated by a pair of toggle levers or links 52, 53 which extend transversely across the top of the car and are pivoted together at their upper ends, as shown at 54. The link 52 has its lower end pivoted to the short inner end of the lever 45, as shown at 55, and the lever 53 is pivoted in a bifurcated bearing plate 56 arranged upon the opposite side of the car platform, as shown in Figs. 1 and 2 of the drawings. The pivot 54 is adapted to be raised and lowered for the purpose of lowering or raising the lever 45, and this is effected by means of a chain 57, the upper end of which is connected to said pivot or to either of the links 52, 53 and the lower portion of which passes around a guide pulley 58 journaled in suitable bearings 59 arranged on the platform beneath said links. The other end of the chain 57 is connected to a segmental head 59' fixed upon a lever 60 concentrically with its pivot 61 which is arranged in suitable bearings upon the car platform. Said lever 60 carries a locking pawl 62 to co-act with a segmental locking rack 63 whereby the chain may be held in an adjusted position for the purpose of maintaining the toggle links 52, 53, and hence the beam or lever 45, in adjusted angular positions with respect to each other. The inner end of the chain 43 is attached to and wound upon a drum 64 arranged on a shaft 65 journaled in the lever 45. If desired, a crank handle 66 may be provided on said shaft, and a pawl 67 may be pivoted on the lever 45 to engage an annular series of ratchet teeth 68 provided upon one end of the drum. By means of this connection the chain 43 may be lengthened or shortened to lower or raise the cutting mechanism 6 without changing the position of the toggle links 52, 53 and the supporting lever 45. The pivot 55 is preferably made removable so that when it is removed the bearing cap 47 of the lever 45 may be swung on its pivot 46 to move said lever longitudinally of the car platform and thereby permit the car to pass under a comparatively low bridge or through a tunnel or other contracted passageway.

For the purpose of reinforcing the cutting mechanism 6 when lowered to an operative position, a diagonal brace 69 is provided. This brace has its outer end secured to the center or intermediate portion of the body bar 7 of the cutting mechanism and its inner end is connected by a pivot 70 to a rigid section 71 connected to the car. Said pivot 70 is in longitudinal alinement with the pivot 8 of the bar 7 so that the brace 69 will swing with the cutting mechanism when the latter is raised or lowered.

We wish it understood that any power transmitting devices may be employed for transmitting power from either or both of the inside axles of a car to the cutting mechanism on either or both sides of the car, but we preferably employ sprocket wheel and chain transmission gearing, cog gearing or friction gearing. We wish it further distinctly understood that while we have shown in the drawings and described above the cutting mechanism as applied to one side only of the car, said mechanism may be duplicated on the other side of the car so that the grass on both sides of the track or right of way may be simultaneously trimmed.

The operation of the invention and its advantages will be readily understood from the foregoing detail description taken in connection with the accompanying drawings and it is thought that a further explanation is unnecessary.

While the preferred embodiment of the invention has been shown and described in detail, it will be understood that various changes in the form, proportion, arrangement and details of construction may be resorted to without departing from the spirit of the invention.

Having thus described the invention what is claimed is:

1. The combination of a car having a platform and supporting wheels, a shaft arranged longitudinally beneath the platform, means for driving said shaft from the car wheel, a vertical guide depending from one side of the platform, a transversely extending and vertically swinging hanger hung from said shaft and arranged in said guide, a cutting mechanism pivotally mounted for swinging movement upon the outer end of said hanger, means for driving said cutting mechanism from said longitudinal shaft, means for raising and lowering the outer end of the hanger, a supporting member mounted upon the platform and connected to the outer end of the cutting mechanism, toggle links for actuating said member and means for adjusting said toggle links.

2. The combination of a car having a platform and supporting wheels, a shaft arranged longitudinally beneath the platform, means for driving said shaft from the car wheel, a vertical guide depending from one side of the platform, a transversely extending and vertically swinging hanger hung from said shaft and arranged in said guide, a cutting mechanism pivotally mounted for swinging movement upon the outer end of said hanger, means for driving said cutting mechanism from said longitudinal shaft, means for raising and lowering the outer end of the hanger, a vertical pivot carried by the platform, a bearing arranged on said pivot, a lever fulcrumed intermediate its ends in said bearing, a connection between the outer end of said lever and the outer end of said cutting mechanism, toggle links connected to the inner end of said lever for adjusting the same and means for adjusting said toggle links.

3. The combination of a car, a cutting mechanism projecting from one side of the same, means for driving said cutting mechanism, a bearing carried by the car and rotatable upon a vertical pivot, a vertically swinging supporting member mounted on said bearing, a connection between said member and said cutting mechanism, and toggle links for adjusting said member.

4. The combination of a car, a cutting mechanism projecting from one side of the same, means for driving said mechanism from the car wheels, a swinging supporting lever pivoted intermediate its ends and having its outer end connected to the outer end of the cutting mechanism, toggle links for adjusting the inner end of the supporting lever, a flexible element connected to said toggle links, and means for adjusting said element.

5. The combination of a car, a cutting mechanism projecting from one side of the same, means for driving said mechanism from the car wheels, a swinging supporting lever pivoted intermediate to the outer end ing its outer end connected to the outer end of the cutting mechanism and toggle links for adjusting the inner end of the supporting lever.

6. The combination of a car, a vertically swinging cutting mechanism projecting from one side of the same, means for driving said mechanism from the car wheels, a bearing carried by the car and rotatable on a vertical pivot, a lever fulcrumed intermediate its ends on said rotatable bearing, means for adjusting the inner end of the lever, a guide upon the outer end of the lever, a windlass upon the intermediate portion of the lever and a flexible connection passed over said guide and having one end connected to the windlass and its other end to the outer portion of the cutting mechanism.

7. The combination of a car, a cutting mechanism projecting from one side of the same, means for driving said mechanism from the car wheels, a bearing carried by the car and rotatable upon a vertical pivot, a lever pivoted intermediate its ends in said rotatable bearing, a connection between the outer end of the lever and the outer end of said cutting mechanism, and an adjusting means for said lever detachably connected to its inner end.

8. The combination of a car, a cutting mechanism projecting from one side of the same, means for driving said mechanism from the car wheels, a bearing carried by the car and rotatable upon a vertical pivot, a lever pivoted intermediate its ends in said rotatable bearing, a connection between the outer end of the lever and the outer end of said cutting mechanism, a pair of toggle links, a fixed bearing for one of said links, a detachable pivot uniting the other link to the inner end of said lever and means for actuating said toggle links to vary the angle of one with respect to the other and thereby raise and lower said lever.

9. The combination of a car, a cutting mechanism projecting from one side of the same, means for driving said mechanism from the car wheels, a lever pivoted intermediate its ends and having its outer end operatively connected to the outer end of the cutting mechanism, a pair of toggle links, a fixed bearing for one of said links, a pivot uniting the other link to the inner end of said lever, a chain for actuating said links, and means for adjusting said chain.

10. The combination of a car having a platform, a longitudinal shaft arranged adjacent to one of the axles of the car, gearing between said axle and shaft, a sprocket wheel on said shaft, a vertically swinging and transversely disposed hanger, a cutting mechanism having a body bar, a reciprocatory cutter bar and guard teeth, a pivot uniting the body bar to said hanger, a sprocket wheel upon the last mentioned pivot and having a crank pin, a pitman uniting the latter to said cutter bar, a sprocket chain connecting the two sprocket wheels, means for raising and lowering said hanger, and means for supporting the outer end of the body bar of the cutting mechanism.

11. The combination of a car, a vertically swinging cutting mechanism projecting from one side of the same, a bearing carried by the car and rotatable upon a vertical pivot, a vertically swinging supporting member on said bearing, a connection between said supporting member and the outer portion of the cutting mechanism and means for adjusting said supporting member.

12. The combination of a support, a vertically swinging cutting mechanism projecting from one side of the same, a supporting member mounted for both vertical and horizontal swinging movement, a connection between said member and the outer portion of the cutting mechanism, and means for adjusting said supporting member.

13. The combination of a support, a vertically swinging cutting mechanism projecting from one side of the same, a supporting member mounted for both vertical and horizontal swinging movement, a connection between said member and the outer portion of the cutting mechanism, toggle links detachably connected to the supporting member for adjusting the same and means for adjusting said toggle links.

In testimony whereof we hereunto affix our signatures in the presence of two witnesses.

WALTER J. CLARKE.
SAMUEL A. STREAM.

Witnesses:
J. A. SOHN,
FRANK MEYER.